US008711068B2

(12) United States Patent
Choi

(10) Patent No.: US 8,711,068 B2
(45) Date of Patent: Apr. 29, 2014

(54) LIQUID CRYSTAL DISPLAY DEVICE AND DRIVING METHOD THEREOF

(75) Inventor: Yeon Ho Choi, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 1394 days.

(21) Appl. No.: 11/634,442

(22) Filed: Dec. 6, 2006

(65) Prior Publication Data

US 2007/0126687 A1 Jun. 7, 2007

(30) Foreign Application Priority Data

Dec. 6, 2005 (KR) ........................ 10-2005-0118062

(51) Int. Cl.
*G09G 3/36* (2006.01)
*G06F 3/038* (2013.01)
*G09G 5/00* (2006.01)

(52) U.S. Cl.
USPC .............................. 345/87; 345/102; 345/212

(58) Field of Classification Search
USPC ...................................................... 345/87, 98
See application file for complete search history.

(56) References Cited

U.S. PATENT DOCUMENTS

2002/0041281 A1* 4/2002 Yanagi et al. ................. 345/212
2005/0237293 A1* 10/2005 Kim et al. ..................... 345/102

* cited by examiner

*Primary Examiner* — Charles V Hicks
(74) *Attorney, Agent, or Firm* — Brinks Gilson & Lione

(57) ABSTRACT

A liquid crystal display device for automatically selecting a common voltage adaptive for a scan line system to supply it to a common electrode of liquid crystal cells is disclosed.
In the liquid crystal display device, a controller is selectively controls a supply of a first common voltage or a second common voltage in accordance with a scan line system of an image signal displayed at a liquid crystal display panel. A first common voltage generator supplies the first common voltage in accordance with a control of the controller to the common electrode of the liquid crystal cells. And, a second common voltage generator supplies the second common voltage in accordance with a control of the controller to the common electrode of the liquid crystal cells.

8 Claims, 6 Drawing Sheets

LIQUID CRYSTAL DISPLAY DEVICE AND DRIVING METHOD THEREOF

This application claims the benefit of priority of Korean Patent Application No. P05-0118062, filed in Korea on Dec. 6, 2005, which is hereby incorporated by reference.

BACKGROUND

1. Technical Field

The present invention relates to a liquid crystal display device, and more particularly to a liquid crystal display device and a driving method thereof that are capable of automatically selecting a common voltage to supply it to a common electrode of liquid crystal cells.

2. Description of the Related Art

A liquid crystal display device (LCD) controls light transmittance of liquid crystal cells based on video signals to thereby display a picture. An active matrix type of liquid crystal display device with a switching device provided for each liquid crystal cell is advantageous for an implementation of moving pictures because it permits an active control of the switching device. The switching device used for the active matrix liquid crystal display device may employ a thin film transistor (hereinafter, referred to as "TFT") as shown in FIG. 1.

Referring to FIG. 1, the active matrix LCD converts a digital input data into an analog data voltage based on a gamma reference voltage to supply it to a data line DL and, at the same time, supplies a scanning pulse to a gate line GL to thereby charge a liquid crystal cell Clc.

A gate electrode of the TFT is connected to the gate line GL while a source electrode thereof is connected to the data line DL. Further, a drain electrode of the TFT is connected to a pixel electrode of the liquid crystal cell Clc and to one electrode of a storage capacitor Cst.

A common electrode of the liquid crystal cell Clc is supplied with a common voltage Vcom.

The storage capacitor Cst charges a data voltage fed from the data line DL when the TFT is turned-on, thereby constantly keeping a voltage at the liquid crystal cell Clc.

If the scanning pulse is applied to the gate line GL, then the TFT is turned on to provide a channel between the source electrode and the drain electrode thereof, thereby supplying a voltage on the data line DL to the pixel electrode of the liquid crystal cell Clc. In this case, liquid crystal molecules of the liquid crystal cell have an alignment changed by an electric field between the pixel electrode and the common electrode to thereby modulate an incident light.

A configuration of the related art LCD including pixels having the above-mentioned structure will be described with reference to FIG. 2. FIG. 2 is a block diagram showing a configuration of a general liquid crystal display device. Referring to FIG. 2, a general liquid crystal display device 100 includes a liquid crystal display panel 110 provided with a thin film transistor (TFT) that drives the liquid crystal cell Clc at an intersection of data lines DL1 to DLm and gate lines GL1 to GLn crossing each other, a data driver 120 that supplies data to the data lines DL1 to DLm of the liquid crystal display panel 110, a gate driver 130 that supplies a scanning pulse to the gate lines GL1 to GLn of the liquid crystal display panel 110, a gamma reference voltage generator 140 that generates a gamma reference voltage to supply it to the data driver 120, a common voltage generator 150 that generates a common voltage Vcom to supply it to the common electrode of the liquid crystal cell Clc of the liquid crystal display panel 110, a gate driving voltage generator 160 that generates a gate high voltage VGH and a gate low voltage VGL to supply them to the gate driver 130, and a timing controller 170 that controls the data driver 120 and the gate driver 130.

The liquid crystal display panel 110 has a liquid crystal injected between two glass substrates. On the lower glass substrate of the liquid crystal display panel 110, the data lines DL1 to DLm and the gate lines GL1 to GLn perpendicularly cross each other. Each intersection between the data lines DL1 to DLm and the gate lines GL1 to GLn is provided with the TFT. The TFT supplies a data on the data lines DL1 to DLm to the liquid crystal cell Clc in response to the scanning pulse. The gate electrode of the TFT is connected to the gate lines GL1 to GLn while the source electrode thereof is connected to the data line DL1 to DLm. Further, the drain electrode of the TFT is connected to the pixel electrode of the liquid crystal cell Clc and to the storage capacitor Cst.

The TFT is turned-on in response to the scanning pulse applied, via the gate lines GL1 to GLn, to the gate terminal thereof. Upon turning-on of the TFT, video data on the data lines DL1 to DLm is supplied to the pixel electrode of the liquid crystal cell Clc. The data driver 120 supplies data to the data lines DL1 to DLm based on a data driving control signal DDC supplied from the timing controller 170. Further, the data driver 120 samples and latches a digital video data RGB fed from the timing controller 170, and then converts it into an analog data voltage capable of expressing a gray scale level at the liquid crystal cell Clc of the liquid crystal display panel 110 based on a gamma reference voltage from the gamma reference voltage generator 140, thereby supplying it the data lines DL1 to DLm.

The gate driver 130 sequentially generates a scanning pulse, that is, a gate pulse in response to a gate driving control signal GDC and a gate shift clock GSC supplied from the timing controller 170 to supply them to the gate lines GL1 to GLn. In this case, the gate driver 130 determines a high level voltage and a low level voltage of the scanning pulse in accordance with the gate high voltage VGH and the gate low voltage VGL from the gate driving voltage generator 160.

The gamma reference voltage generator 140 receives a power supply voltage VCC of 0V to 3.3V supplied from a system installed the liquid crystal display device 100, for example, a controller (not shown) of an image display apparatus such as a TV set, etc to generated a positive gamma reference voltage and a negative gamma reference voltage and output them to the data driver 120.

The common voltage generator 150 receives the power supply voltage VCC to generate a common voltage Vcom, and supplies it to the common electrode of the liquid crystal cell Clc provided at each pixel of the liquid crystal display panel 110.

The gate driving voltage generator 160 is applied with the power supply voltage VCC of 3.3V supplied from the system to generate the gate high voltage VGH and the gate low voltage VGL, and supplies them to the gate driver 130. Herein, the gate driving voltage generator 160 generates a gate high voltage VGH more than a threshold voltage of the TFT provided at each pixel of the liquid crystal display panel 110 and a gate low voltage VGL less then the threshold voltage of the TFT. The gate high voltage VGH and the gate low voltage VGL generated in this manner are used to determine a high level voltage and a low level voltage of the scanning pulse generated by the gate driver 130, respectively.

The timing controller 170 supplies a digital video data RGB supplied from a digital video card (not shown) to the data driver 120 and, at the same time, generates a data driving control signal DCC and a gate driving control signal GDC using horizontal/vertical synchronizing signals H and V in response to a clock signal CLK to supply them to the data driver 120 and the gate driver 130, respectively. Herein, the data driving control signal DDC includes a source shift clock SSC, a source start pulse SSP, a polarity control signal POL and a source output enable signal SOE, or other signals, and the gate driving control signal GDC includes a gate start pulse GSP and a gate output enable signal GOE, or other signals. The timing controller 170 generates a gate shift clock GSC to adjust a swing width of a gate pulse output from the gate driver 130 to supply it to the gate driver 130. In this case, a high-level voltage and a low-level voltage of the gate shift clock GSC is 3.3V and 0V, respectively. If the gate shift clock GSC is supplied, then the gate driver 130 determines a high-level voltage and a low-level voltage of the gate pulse using the gate high voltage VGH and the gate low voltage VGL supplied from the gate driving voltage generator 160 in accordance with the gate shift clock GSC.

As described above, since a related art liquid crystal display device always supplies a constant common voltage to a common electrode of liquid crystal cells Clc regardless of a scan line system such as a phase-alternating line (PAL) system driven with a frequency of 50 Hz or a National Television Systems Committee NTSC system driven with a frequency of 60 Hz, there is raised a problem in that a flicker and a residual image are generated on the screen.

SUMMARY

A liquid crystal display device comprises a controller that selectively controls a supply of a first common voltage or a second common voltage based on a scan line system of an image signal displayed at a liquid crystal display panel; a first common voltage generator that supplies the first common voltage based on a control of the controller to the common electrode of the liquid crystal cells; and a second common voltage generator that supplies the second common voltage based on a control of the controller to the common electrode of the liquid crystal cells.

Input

A method of driving a liquid crystal display device includes judging a scan line system of an image signal displayed at a liquid crystal display panel via a scan line format; and supplying a common voltage adaptive for the judged scan line system to a common electrode of liquid crystal cells.

A liquid crystal display device is disclosed that includes a frame counter that counts the number of the input frame; a controller that judges a scan line system of an image signal displayed at a liquid crystal display panel via a frame number counted by the frame counter during a designated unit time to selectively control a supply of a first common voltage and a second common voltage based on the judged scan line system; a first common voltage generator that supplies the first common voltage to a common electrode of liquid crystal cells based on a control of the controller; and a second common voltage generator that supplies the second common voltage to a common electrode of liquid crystal cells based on a control of the controller.

A method of driving a liquid crystal display device includes counting the input frame number during a designated unit time; judging a scan line system of an image signal displayed at a liquid crystal display panel via the counted frame number; and supplying a common voltage adaptive for the judged scan line system to a common electrode of liquid crystal cells.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

These and other objects of the invention will be apparent from the following detailed description of the embodiments of the present invention with reference to the accompanying drawings, in which.

DETAILED DESCRIPTION

Figure 1:
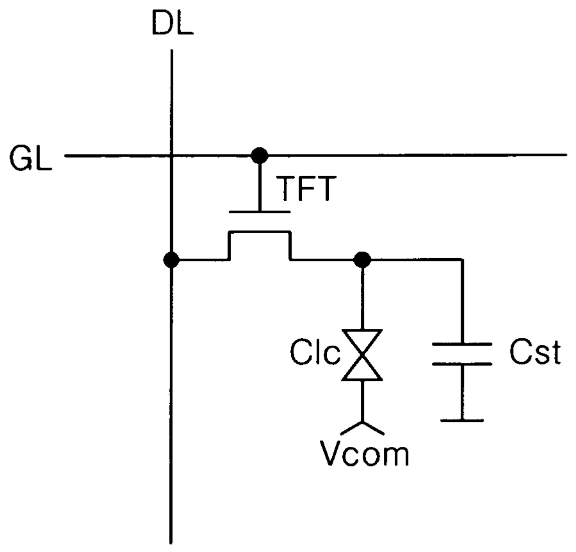
FIG.1 RELATED ART
FIG. 1 is an equivalent circuit diagram of a pixel provided at an example liquid crystal display device.
Figure 2:
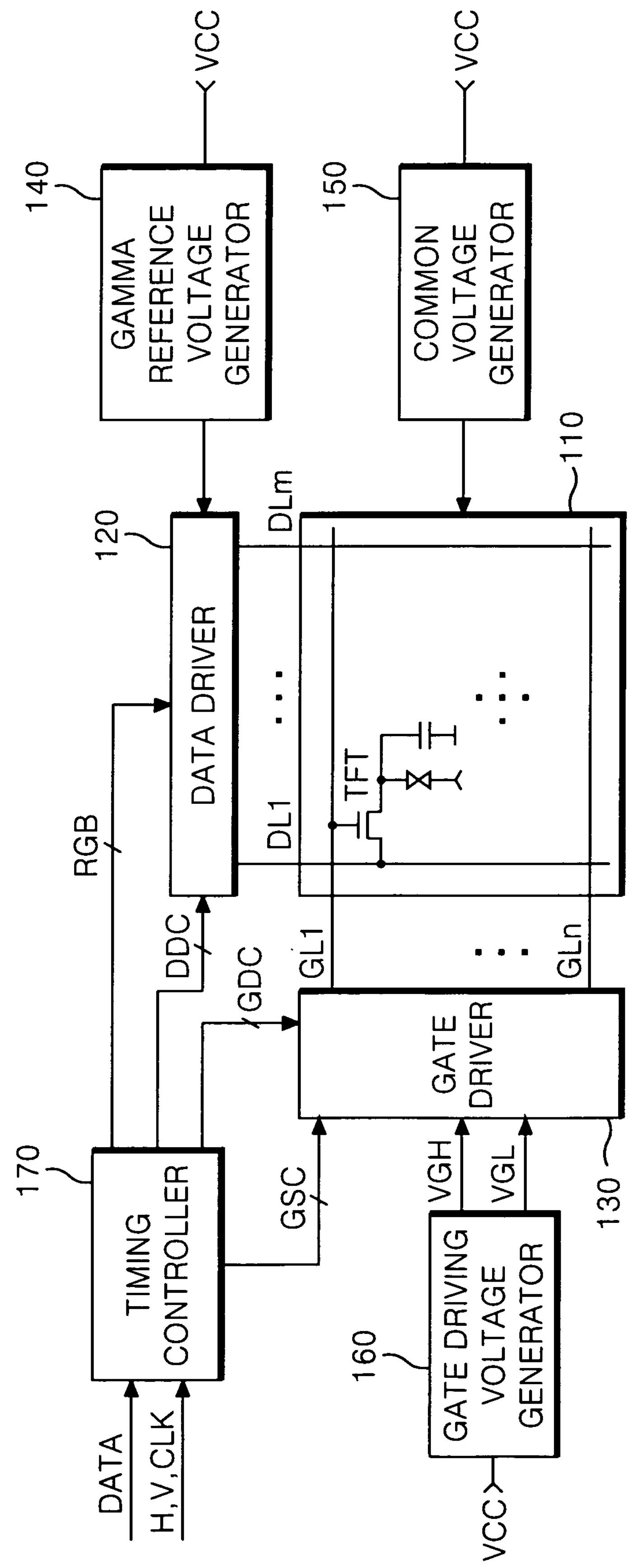
FIG. 2 RELATED ART
FIG. 2 is an example block diagram showing a configuration of a related art liquid crystal display device.
Figure 3:
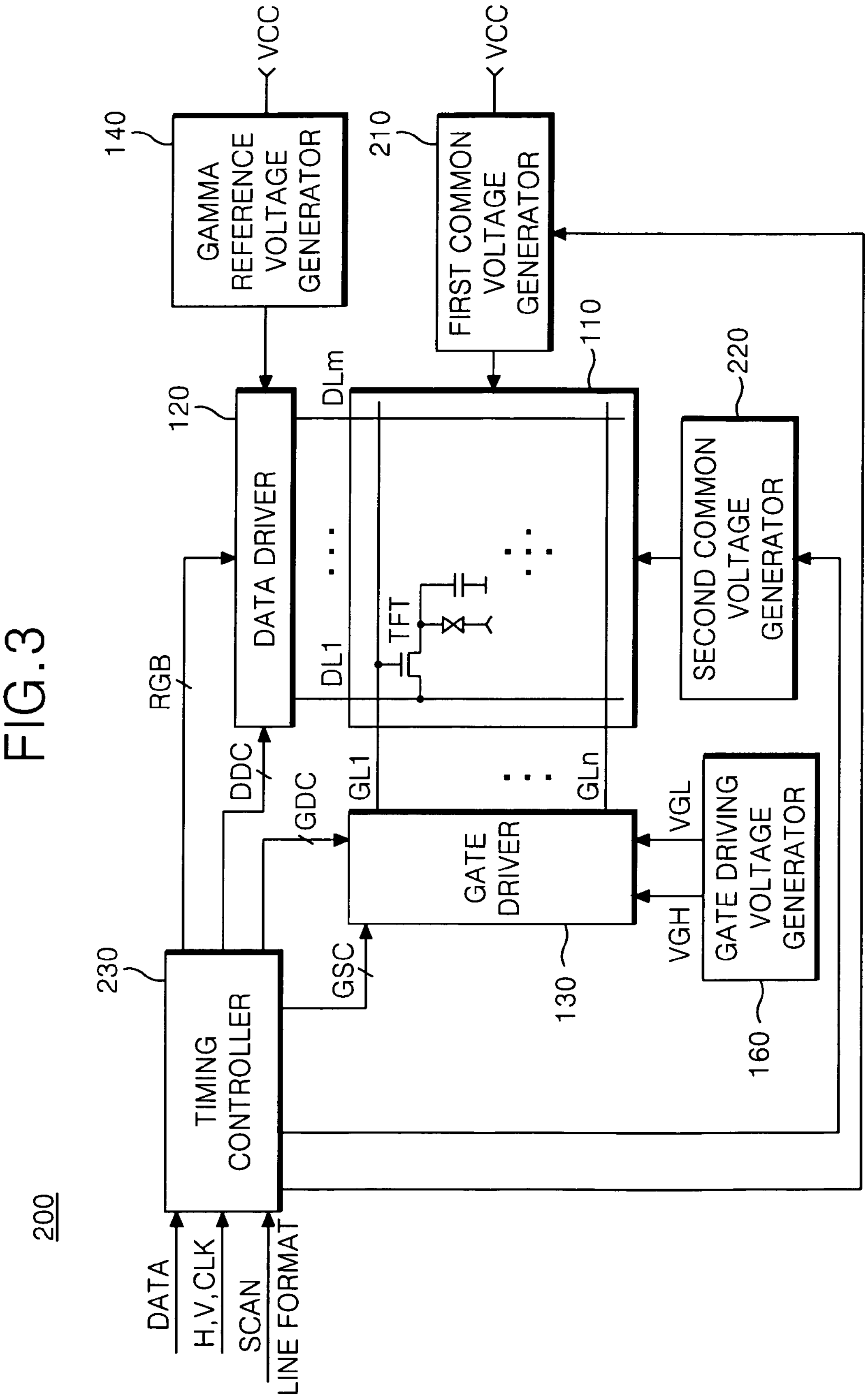
FIG. 3 is an example block diagram showing a configuration of a liquid crystal display device.

FIG. 3 is an block diagram showing a configuration of a liquid crystal display device. Referring to FIG. 3, a liquid crystal display device 200 includes the liquid crystal display panel 110, a data driver 120, a gate driver 130, a gamma reference voltage generator 140 and a gate driving voltage generator 160 likewise the liquid crystal display device 100 as shown in FIG. 2. The liquid crystal display device 200 includes a first common voltage generator 210 driven by an enable ENB signal to supply a PAL system common voltage to a common electrode of liquid crystal cells Clc A second common voltage generator 220 is driven by an enable ENB signal to supply a NTSC system common voltage to a common electrode of liquid crystal cells Clc. A timing controller 230 judges a scan line system of an image signal displayed at the liquid crystal display panel 110 via the input scan line format to selectively control a common voltage supply of the first and second common voltage generator 210 and 220.

The first common voltage generator 210 sets a common voltage value to generate a PAL system common voltage and if an enable signal ENB is input from the timing controller 230, then the first common voltage generator 210 is enabled to supply a PAL system common voltage to a common electrode of liquid crystal cells Clc, and if a disable signal DIB is input from the timing controller 230, then the first common voltage generator 210 is disabled to stop a supply of a PAL system common voltage.

The second common voltage generator 220 sets a common voltage value to generate an NTSC system common voltage and if an enable signal ENB is input from the timing controller 230, then the second common voltage generator 220 is enabled to supply a NTSC system common voltage to a common electrode of liquid crystal cells Clc, and if a disable signal DIB is input from the timing controller 230, then the second common voltage generator 220 is disabled to stop a supply of a NTSC system common voltage.

The timing controller 230 supplies a digital video data RGB supplied from a digital video card (not shown) to the data driver 120 and, at the same time, generates a data driving control signal DCC and a gate driving control signal GDC using horizontal/vertical synchronizing signals H and V in response to a clock signal CLK to supply them to the data driver 120 and the gate driver 130, respectively. The timing controller 230 generates a gate shift clock GSC used for adjusting a swing width of a gate pulse output from the gate driver 130 to supply it to the gate driver 130.

A common voltage control execution program for judging a scan line system via a scan line format to control a generation of a PAL system common voltage and a NTSC system common voltage is set at the timing controller 230 to control a supply of a common voltage as follows.

The timing controller 230 judges whether a scan line system of an image signal displayed at the liquid crystal display panel 110 via a scan line format input via a connector (not shown) is a PAL system or a NTSC system. If a scan line system is a PAL system, then the timing controller 230 supplies an enable signal ENB to the first common voltage generator 210 and supplies a disable signal DIB to the second common voltage generator 220. Accordingly, the first common voltage generator 210 is enabled by an enable signal ENB to supply a PAL system common voltage to a common electrode of liquid crystal cells Clc while the second common voltage generator 220 is disabled by a disable signal DIB to stop a supply of a NTSC system common voltage.

If a scan line system of an image signal displayed at the liquid crystal display panel 110 is an NTSC system, then the timing controller 230 supplies an enable signal ENB to the second common voltage generator 220 and supplies a disable signal DIB to the first common voltage generator 210 at the same time. The second common voltage generator 220 is enabled by an enable signal ENB to supply a NTSC system common voltage to a common electrode of liquid crystal cells Clc while the first common voltage generator 210 is disabled by a disable signal DIB to stop a supply of a PAL system common voltage.

On the other hand, the common voltage control execution program is set at the timing controller 230 to selectively supply a common voltage adaptive for a scan line system, but it is not confined by this. For example, the common voltage control execution program is set at a controller (not shown) implemented separately other than the timing controller 230, so that the controller may control a common voltage supply of the first and second common voltage generator 210 and 220.

Figure 4:
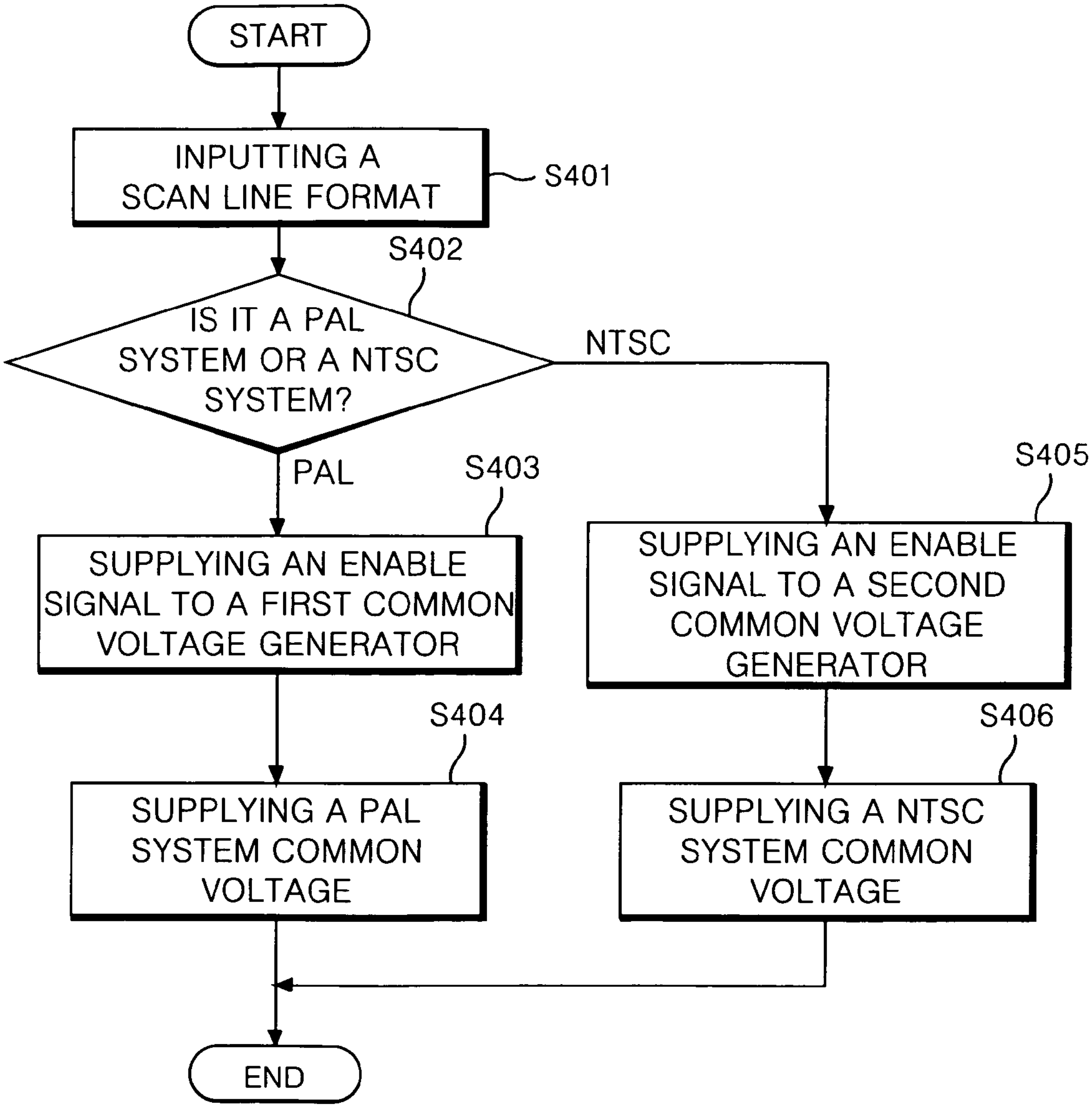
FIG. 4 is an example flow chart of acts taken to drive the liquid crystal display device.

FIG. 4 illustrates a process by which the liquid crystal display device 200 selectively supplies a common voltage in accordance with a scan line system via a scan line format Referring to FIG. 4, if video data to be displayed and a scan line format are input at the liquid crystal display panel 110 (S401), then the timing controller 230 judges whether a scan line system of an image signal to be displayed at the liquid crystal display panel 110 via the input scan line format is a PAL system or an NTSC system (S402).

If the result is a PAL system, then the timing controller 230 supplies an enable signal ENB to the first common voltage generator 210 and supplies a disable signal DIB to the second common voltage generator 220 at the same time (S403). The first common voltage generator 210 is enabled by an enable signal ENB to supply a PAL system common voltage to a common electrode of liquid crystal cells Clc, while the second common voltage generator 220 is disabled by a disable signal DIB to stop a supply of a NTSC system common voltage (S404).

If the result is an NTSC system, then the timing controller 230 supplies an enable signal ENB to the second common voltage generator 220 and supplies a disable signal DIB to the first common voltage generator 210 at the same time (S405). The second common voltage generator 220 is enabled by an enable signal ENB to supply a NTSC system common voltage to a common electrode of liquid crystal cells Clc, while the first common voltage generator 210 is disabled by a disable signal DIB to stop a supply of a PAL system common voltage (S406).

Figure 5:
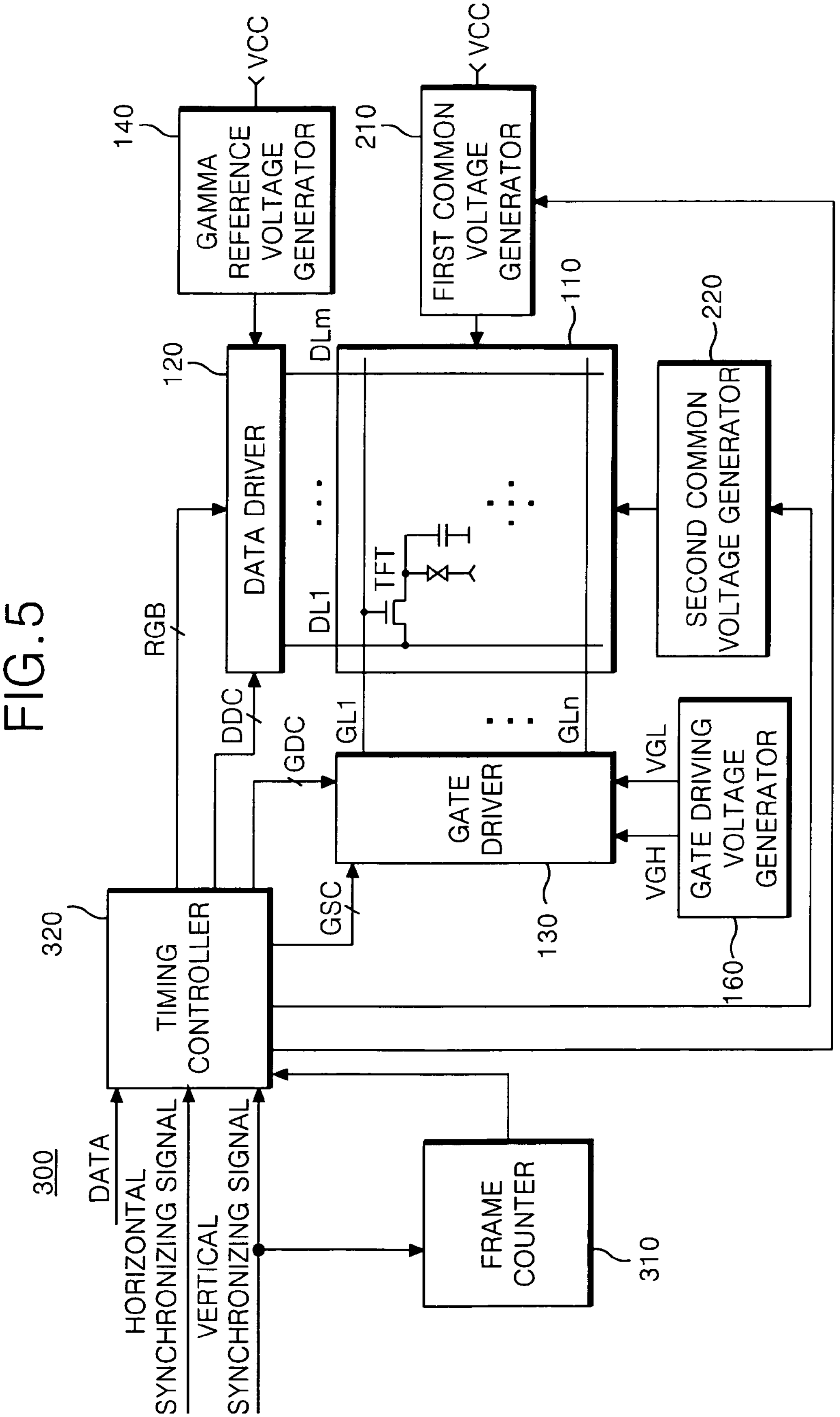
FIG. 5 is an example block diagram showing a configuration of a liquid crystal display device.

FIG. 5 is a block diagram showing a configuration of a liquid crystal display device. Referring to FIG. 5, a liquid crystal display device 300 includes the liquid crystal display panel 110, the data driver 120, the gate driver 130, the gamma reference voltage generator 140, the gate driving voltage generator 160, the first common voltage generator 210 and the second common voltage generator 220.

The liquid crystal display device 300 includes a frame counter 310 that counts the number of the input frame; and a timing controller 320 that judges a scan line system of an image signal displayed at the liquid crystal display panel 110 via a frame number counted by the frame counter 310 during a designated unit time to selectively control a common voltage supply of the first and second common voltage generator 210 and 220 based on the judged scan line system.

The frame counter 310 counts the input frame number to output the counted frame number into the timing controller 320. For example, the frame counter 310 counts the number of a rising edge of the input vertical synchronizing signal to thereby count a frame number.

The timing controller 320 supplies a digital video data RGB supplied from a digital video card (not shown) to the data driver 120 and, at the same time, generates a data driving control signal DCC and a gate driving control signal GDC using horizontal/vertical synchronizing signals H and V in response to a clock signal CLK to supply them to the data driver 120 and the gate driver 130, respectively. The timing controller 320 generates a gate shift clock GSC used for adjusting a swing width of a gate pulse output from the gate driver 130 to supply it to the gate driver 130.

A common voltage control execution program for judging a scan line system via a frame number to control a generation of a PAL system common voltage and a NTSC system common voltage is set at the timing controller 320 to control a supply of a common voltage as follows.

The timing controller 320 judges whether a scan line system of an image signal displayed at the liquid crystal display panel 110 via a frame number counted by the frame counter 310 during a designated unit time is a PAL system or a NTSC system. Herein, if a frame number counted during a designated unit time, that is, one second, is a predeterminded first reference frame number, that is, fifty frames, then the timing controller 320 judges a PAL system using a frequency of 50 Hz. If a frame number counted during a designated unit time, that is, one second, is a predeterminded second reference frame number, that is, sixty frames, then the timing controller 320 judges a NTSC system using a frequency of 60 Hz. A method of judging a scan line system using a frame number can be changed in a variety of system by the users.

If a scan line system is judged as a PAL system by the counted frame number, then the timing controller 320 supplies an enable signal ENB to the first common voltage generator 210 and supplies a disable signal DIB to the second common voltage generator 220 at the same time. The first common voltage generator 210 is enabled by an enable signal ENB to supply a PAL system common voltage to a common electrode of liquid crystal cells Clc while the second common voltage generator 220 is disabled by a disable signal DIB to stop a supply of a NTSC system common voltage.

If a scan line system is judged as a NTSC system by the counted frame number, then the timing controller 230 supplies an enable signal ENB to the second common voltage generator 220 and supplies a disable signal DIB to the first common voltage generator 210 at the same time. The second common voltage generator 220 is enabled by an enable signal ENB to supply an NTSC system common voltage to a common electrode of liquid crystal cells Clc while the first common voltage generator 210 is disabled by a disable signal DIB to stop a supply of a PAL system common voltage.

The common voltage control execution program may be set for judging a scan line system using a frame number at the timing controller 320 to selectively supply a common voltage adaptive for a scan line system, but it is not confined by this. For example, the common voltage control execution program is set at a controller (not shown) implemented separately other than the timing controller 320, so that the controller may control a common voltage supply of the first and second common voltage generator 210 and 220. The frame counter 310 may then be implemented in such a manner to output the counted frame number into the controller.

Figure 6:
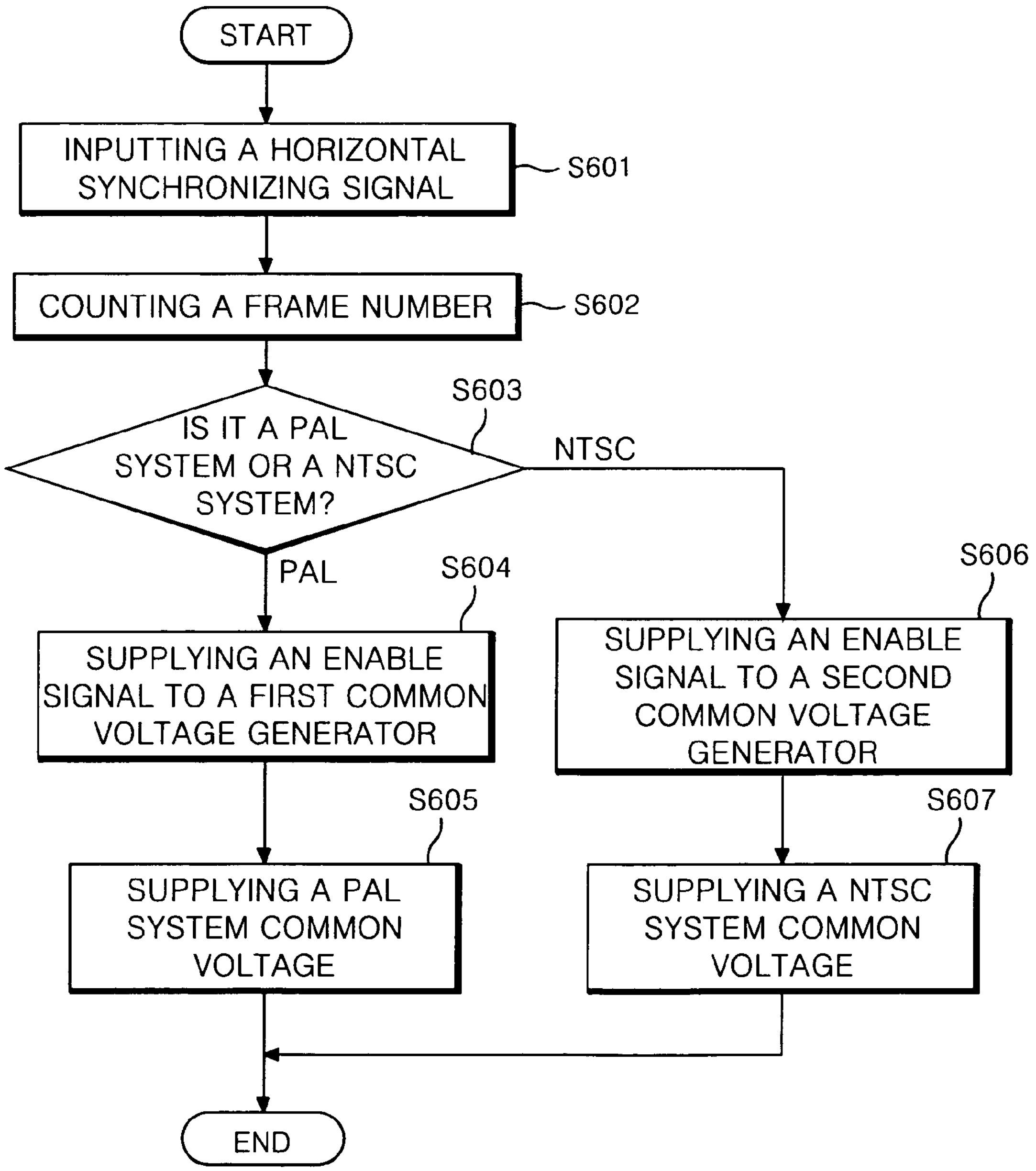
FIG. 6 is an example flow chart showing acts taken to drive the liquid crystal display device.

FIG. 6 illustrates example acts in a process which the liquid crystal display device 300 having the above-mentioned configuration selectively supplies a common voltage based on a scan line system judged via a frame number. Referring to FIG. 6, if a video data to be displayed and a vertical synchronizing signal are input at the liquid crystal display panel 110 (S601), then the frame counter 310 counts the number of the input frame to output the timing controller 320 (S602).

The timing controller 320 compares whether a frame number counted during a designated unit time is the same as the number of a predeterminded first reference frame or the number of a predeterminded second reference frame. The timing controller 320 judges whether a scan line system of an image signal to be displayed at the liquid crystal display panel 110 is a PAL system or an NTSC system (S603). Herein, the number of a predeterminded first reference frame can be set in fifty frames, which shows a frame number of a PAL system, and the number of a predeterminded second reference frame can be set in sixty frames which shows a frame number of an NTSC system.

As a result, if the counted frame number is the same as the predeterminded first reference frame number to be judged as a PAL system, then the timing controller 320 supplies an enable signal ENB to the first common voltage generator 210 and supplies a disable signal DIB to the second common voltage generator 220 at the same time (S604). The first common voltage generator 210 is enabled by an enable signal ENB to supply a PAL system common voltage to a common electrode of liquid crystal cells Clc while the second common voltage generator 220 is disabled by a disable signal DIB to stop a supply of a NTSC system common voltage (S605).

If the counted frame number is the same as the predeterminded second reference frame number to be judged as a NTSC system, then the timing controller 320 supplies an enable signal ENB to the second common voltage generator 220 and supplies a disable signal DIB to the first common voltage generator 210 at the same time (S606). Accordingly, the second common voltage generator 220 is enabled by an enable signal ENB to supply a NTSC system common voltage to a common electrode of liquid crystal cells Clc while the first common voltage generator 210 is disabled by a disable signal DIB to stop a supply of a PAL system common voltage (S607).

As described above, the disclosed system automatically selects a PAL system common voltage and a NTSC system common voltage based on a scan line system such as a PAL system or a NTSC system, so that it becomes possible to prevent a generation of a flicker and a residual image on the screen.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A liquid crystal display device comprising:

a frame counter operable to count a number of an input frame;

a controller operable to judge a scan line system of an image signal displayed on a liquid crystal display panel via a frame number counted by the frame counter during a designated unit time to selectively control a supply of a first common voltage and a second common voltage based on the judged scan line system, wherein the controller includes a first control output port for outputting a first enable/disable signal and a second control output port for outputting a second enable/disable signal;

a first common voltage generator operable to supply the first common voltage directly to a common electrode of liquid crystal cells based on a control of the controller wherein the first common voltage generator is configured to be enabled and disabled via the first enable/disable signal communicated from the first control output port; and a second common voltage generator operable to supply the second common voltage directly to a common electrode of liquid crystal cells based on a control signal of the controller wherein the second common voltage generator is configured to be enabled and disabled via the second enable/disable signal communicated from the second control output port, wherein the frame counter counts a number of a rising edge of the input vertical synchronizing signal to thereby count a frame number, wherein if the counted frame number is the same as a predetermined first reference frame number to be judged as a phase-alternating line (PAL) system, the controller communicates the first enable/disable signal comprising an enable signal via the first control output port to the first common voltage generator and simultaneously communicates the second enable/disable signal comprising a disable signal via the second control output port to the second common voltage generator at the same time, wherein if the counted frame number is the same as a predetermined second reference frame number to be judged as a National Television Systems Committee (NTSC) system, the controller communicates the second enable/disable signal comprising an enable signal via the second control output port to the second common voltage generator and simultaneously communicates the first enable/disable signal comprising a disable signal via the first control output port to the first common voltage generator at the same time, and wherein the first and second common voltage generators are separate and independently controlled by the controller.

2. The liquid crystal display device of claim 1, wherein said first common voltage is a common voltage for the phase-alternating line (PAL) system.

3. The liquid crystal display device as claimed in claim 1, wherein if the enable signal is supplied to the first common voltage generator, the second common voltage generator is disabled by the disable signal to stop a supply of the common voltage for the National Television Systems Committee (NTSC) system.

4. The liquid crystal display device of claim 1, wherein said first common voltage generator is driven by the enable signal to supply the first common voltage.

5. The liquid crystal display device of claim 1, wherein said second common voltage is a common voltage for the National Television Systems Committee (NTSC) system.

6. The liquid crystal display device of claim 5, wherein if the enable signal is supplied to the second common voltage generator, the first common voltage generator is disabled by the disable signal to stop a supply of the common voltage for the phase-alternating line (PAL) system.

7. The liquid crystal display device of claim 1, wherein said second common voltage generator is driven by the enable signal to supply the second common voltage.

8. A method of driving a liquid crystal display device comprises the steps of:

counting the input frame number during a designated unit time;

judging a scan line system of an image signal displayed at a liquid crystal display panel via the counted frame number;

communicating from a first output port of a controller an enable signal to a first common voltage generator to generate a phase-alternating line (PAL) system common voltage and communicating from a second output port of the controller a disable signal to a second common voltage generator to generate a National Television Systems Committee (NTSC) system common voltage, if the judged scan line system is the PAL system;

communicating from the first output port of the controller a disable signal to the first common voltage generator and communicating from the second output port of the controller an enable signal to the second common voltage generator if the judged scan line system is the NTSC system; and supplying a voltage from one of the first common voltage generator or the second common voltage generator directly to a common electrode of liquid crystal cells based on the judged scan line system, wherein counting the input frame number during a designated unit time includes counting a number of a rising edge of the input vertical synchronizing signal to thereby count a frame number, wherein if the counted frame number is the same as a predetermined first reference frame number to be judged as the phase-alternating line (PAL) system, the enable signal is supplied from the first output port to the first common voltage generator and the disable signal is supplied from the second output port to the second common voltage generator at the same time, wherein if the counted frame number is the same as a predetermined second reference frame number to be judged as the National Television Systems Committee (NTSC) system, the enable signal is supplied from the second output port to the second common voltage generator and the disable signal is supplied from the first output port to the first common voltage generator at the same time, and wherein the first and second common voltage generators are separate and independently controlled by the controller.

* * * * *